(12) United States Patent
Gomes De Oliveira et al.

(10) Patent No.: US 11,530,151 B2
(45) Date of Patent: Dec. 20, 2022

(54) CONTINUOUS-, LINEAR-, FLEXIBLE-CHANNEL SEWAGE TREATMENT PROCESS, THROUGH A MODIFIED AEROBIC BIOLOGICAL REACTOR SYSTEM, OR TRANSFORMATION OF AN EXISTING ANAEROBIC BIOLOGICAL REACTOR INTO A MODIFIED AEROBIC BIOLOGICAL REACTOR, COUPLED WITH A MODIFIED FLEXIBLE FLOTATION/DECANTING SYSTEM

(71) Applicant: DT ENGENHARIA DE EMPREENDIMENTOS LTDA, Barueri SP (BR)

(72) Inventors: João Carlos Gomes De Oliveira, Santana de Parnaíba (BR); Procópio Gomes De Oliveira Netto, Santana de Parnaíba (BR); Felipe Gomes De Oliveira, Santana de Parnaíba (BR); Daniel Gomes De Oliveira, Santana de Parnaíba (BR)

(73) Assignee: DT ENGENHARIA DE EMPREENDIMENTOS LTDA, Barueri SP (BR)

( * ) Notice: Subject to any disclaimer, the term of this patent is extended or adjusted under 35 U.S.C. 154(b) by 7 days.

(21) Appl. No.: 17/374,018

(22) Filed: Jul. 13, 2021

(65) Prior Publication Data
US 2022/0017396 A1    Jan. 20, 2022

(30) Foreign Application Priority Data
Jul. 20, 2020  (BR) .......................... 102020014726-9

(51) Int. Cl.
*C02F 9/00* (2006.01)
*C02F 1/52* (2006.01)
(Continued)

(52) U.S. Cl.
CPC .................. *C02F 9/00* (2013.01); *C02F 3/02* (2013.01); *C02F 1/004* (2013.01); *C02F 1/52* (2013.01);
(Continued)

(58) Field of Classification Search
CPC .... C02F 9/00; C02F 1/004; C02F 1/52; C02F 1/76; C02F 3/08; C02F 3/20;
(Continued)

(56) References Cited

U.S. PATENT DOCUMENTS 3,470,091 A * 9/1969 Budd ..................... C02F 3/1215
                                                              261/36.1
6,325,936 B1 * 12/2001 Niijima ..................... C02F 1/56
                                                              210/626
(Continued)

FOREIGN PATENT DOCUMENTS

BR      PI 0105462-7 A    4/2003
BR      PI0306256-2 B1    5/2011
(Continued)

*Primary Examiner* — Joseph W Drodge
(74) *Attorney, Agent, or Firm* — Browdy and Neimark, P.L.L.C.

(57) ABSTRACT

Process of sewage treatment in a continuous, linear and flexible channel, through a modified aerobic biological reactor system, or transformation of an existing anaerobic biological reactor into a modified aerobic biological reactor, coupled with a modified flexible flotation/decantation system, intended for the sewage treatment, to be carried out in a treatment plant, in a continuous, linear and flexible channel, using, as preliminary treatment, a garbage grid and a sandbox, to remove these debris, followed by a primary
(Continued)

treatment, where the sewage receives the primary treatment inside an aerobic reactor—modified MBBR, or inside a pond aerated, facultative or anaerobic, transformed into an aerobic reactor—modified MBBR, or even inside an anaerobic reactor—UASB transformed into an aerobic reactor—modified MBBR, followed by a secondary treatment.

10 Claims, 11 Drawing Sheets

(51) Int. Cl.
- *C02F 1/76* (2006.01)
- *C02F 3/02* (2006.01)
- *C02F 3/08* (2006.01)
- *C02F 3/20* (2006.01)
- C02F 1/00 (2006.01)

(52) U.S. Cl.
CPC .................... *C02F 1/76* (2013.01); *C02F 3/08* (2013.01); *C02F 3/20* (2013.01); *C02F 2303/04* (2013.01)

(58) Field of Classification Search
CPC ...... C02F 2303/04; C02F 1/24; C02F 1/5209; C02F 1/5281; C02F 1/72; C02F 3/006; C02F 3/02; C02F 3/085; C02F 3/087; C02F 7/00; C02F 11/02; C02F 11/06; B03D 1/1443; B03D 1/1462; B03D 1/1468; B03D 1/24; B03D 2201/002; E02B 1/003; E02B 3/02; E02B 3/023; E02B 5/08; E02B 5/0855; E02B 8/02; E02B 8/023; B01D 21/00; B01D 21/0003; B01D 21/0084; B01D 21/01; B01D 21/30; B01D 21/34

See application file for complete search history.

(56) References Cited

U.S. PATENT DOCUMENTS

| | | | |
|---|---|---|---|
| 6,802,978 | B2 | 10/2004 | Gomes De Oliveira et al. |
| 2003/0085176 | A1* | 5/2003 | Gomes De Oliveira ... C02F 1/24 210/703 |
| 2004/0245180 | A1* | 12/2004 | Gomes De Oliveira ... C02F 9/00 210/705 |
| 2009/0218281 | A1 | 9/2009 | Sauvignet et al. |
| 2010/0096324 | A1* | 4/2010 | Roberts ..................... C02F 7/00 210/620 |
| 2014/0326648 | A1* | 11/2014 | Gomes De Oliveira . E02B 3/02 210/151 |
| 2015/0175454 | A1* | 6/2015 | Hsieh ........................ C02F 3/12 210/259 |
| 2015/0336827 | A1* | 11/2015 | Boltz ........................ C02F 3/30 210/610 |
| 2016/0075577 | A1* | 3/2016 | Reid ........................ C02F 3/302 210/605 |
| 2016/0221853 | A1* | 8/2016 | Cort ...................... C02F 11/121 |
| 2016/0326016 | A1* | 11/2016 | Park ......................... C02F 1/24 |
| 2017/0015574 | A1* | 1/2017 | Potts ....................... C02F 3/286 |
| 2018/0009690 | A1* | 1/2018 | Reid ...................... C02F 3/121 |
| 2019/0002321 | A1* | 1/2019 | Gronfors .................. C02F 9/00 |
| 2019/0092665 | A1* | 3/2019 | Reid | |
| 2021/0246058 | A1* | 8/2021 | McFadden .............. C02F 3/201 |

FOREIGN PATENT DOCUMENTS

| | | |
|---|---|---|
| CN | 109354342 A | 2/2019 |
| CN | 210215111 U | 3/2020 |
| EP | 1 940 745 B1 | 6/2017 |
| KR | 10-1030787 B1 | 4/2011 |
| WO | 2005/058762 A1 | 6/2005 |

* cited by examiner

CORTE A-A

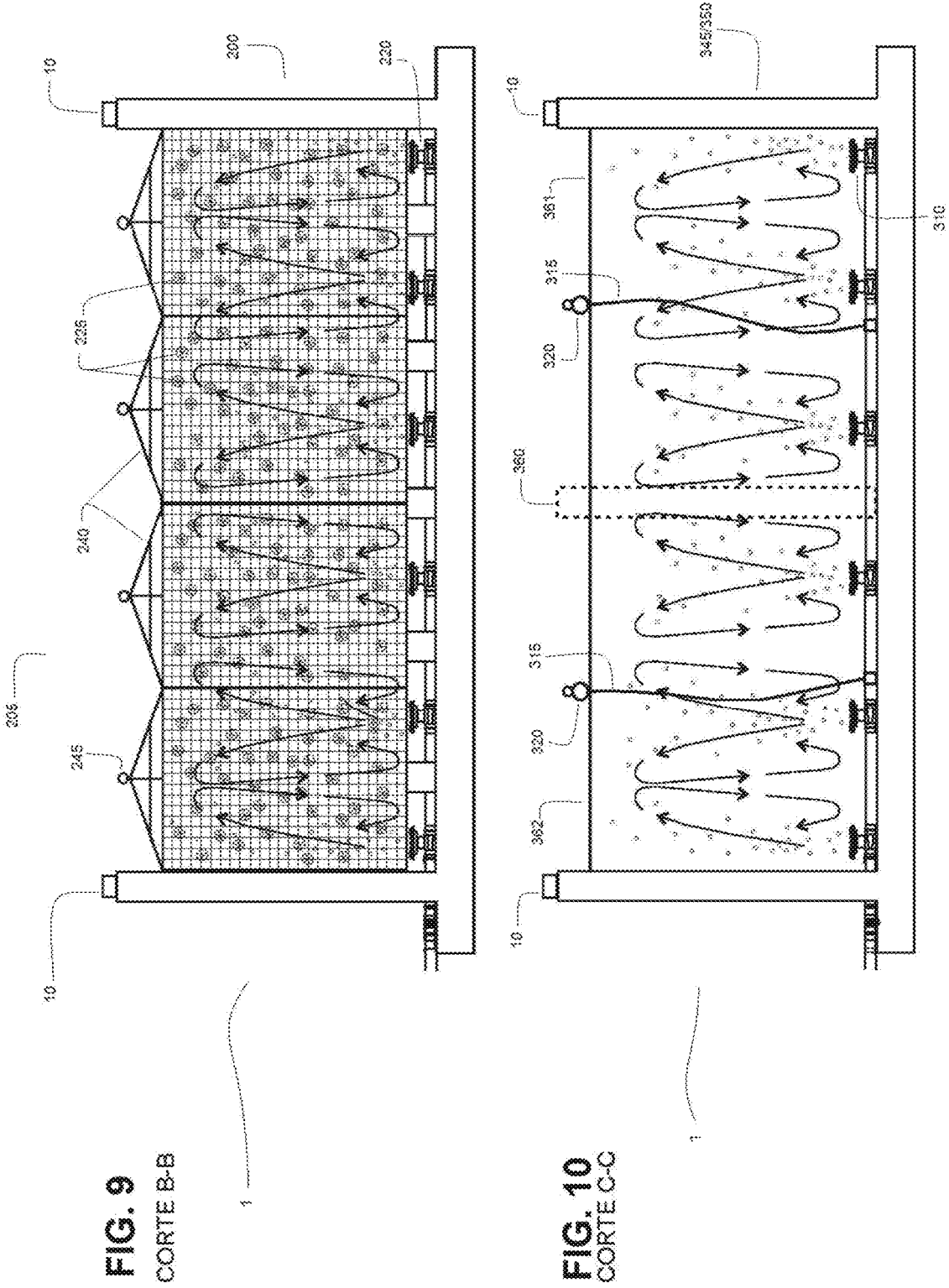

CORTE D-D

CONTINUOUS-, LINEAR-, FLEXIBLE-CHANNEL SEWAGE TREATMENT PROCESS, THROUGH A MODIFIED AEROBIC BIOLOGICAL REACTOR SYSTEM, OR TRANSFORMATION OF AN EXISTING ANAEROBIC BIOLOGICAL REACTOR INTO A MODIFIED AEROBIC BIOLOGICAL REACTOR, COUPLED WITH A MODIFIED FLEXIBLE FLOTATION/DECANTING SYSTEM

TECHNICAL FIELD

This descriptive report refers to an invention patent application for a continuous-, linear-, flexible-channel sewage treatment process, using a primary treatment system based on a modified aerobic biological reactor, or the transformation of an existing anaerobic biological reactor into a modified aerobic biological reactor, or retrofitting an aerated/optional/anaerobic pond into a modified aerobic biological reactor, coupled with a modified secondary treatment system based on flotation/decanting, for a more efficient and cost-effective sewage treatment.

STATE OF THE ART

Human activity causes environmental impacts and generates excess waste and pollutants. Currently, the population increase brings, as a consequence, the increased production of sewage, which should be treated before being discharged into water bodies.

Sewage treatment is necessary so that our water bodies do not become polluted. For sewage treatment, several technologies are currently in the public domain, usually large-scale wastewater treatment plants—WWTP which serve large populations, intended to minimize the impact of said sewage on our environment.

Conventional WWTP normally use a preliminary treatment system, consisting of a grid for garbage removal and a box for silt and sand removal, then a primary treatment through an aerobic or anaerobic biological reactor system and, in certain cases, secondary treatment through a decanting system or conventional flotation, comprising large-scale facilities, occupying extensive areas, where various operating treatment tanks and pipes interconnecting them are laid out.

A conventional WWTP features one or more biological reactor tanks, one or more coagulation and flocculation tanks, one or more decanting or flotation tanks (however, never both simultaneously), one or more contact tanks for disinfection, in addition to multiple interconnecting pipes and, possibly, one or more solid waste storage and drying tanks, in addition to other devices laid out throughout the systems.

Therefore, building a conventional WWTP with large treatment tanks is necessary, which requires large public areas, as well as environmental impact studies for this implementation, in addition to several interconnection pipes, as well as many other parameters that render difficult and expensive the construction of conventional WWTP, which are designed and sized according to the current sewage treatment literature.

Therefore, we can see the need for treatment processes at an affordable cost to small cities, and which provide significant savings for large municipalities; are easy to install; and may even act in association with other existing facilities and systems, expanding their capacity, and have a smaller footprint than conventional WWTP, in addition to consuming less input for the construction of tanks and pipes interconnecting them, thus generating less construction waste, so as to increase the possibility of installations and/or expansions, and, consequently, lower the implementation and operation cost of the entire system.

Another inconvenience is related to the cleaning of the tanks existing at state-of-the-art WWTP, consisting in the fact that cleaning often exposes workers to unhealthy conditions, resulting in questions and recurring labor issues, leading to leaves, illness, and higher social and operating costs to the state-of-the-art treatment systems.

Also, more efficient, environment-friendly treatment is required, which allows accommodating seasonal variations in flow and raw sewage quality characteristics. In addition, treatment should enable a more appropriate operation based on the population flow variation (especially tourist regions, e.g., beaches during summer and mountain areas during winter, where se-age production is increased due to the visiting population, in relation to the use by the local population during the off-season period, which, in some cases requires, only 20 percent of the maximum treatment flow).

One of the systems used as primary biological treatment at conventional plants is the anaerobic reactor, called Upflow Anaerobic Sludge Blanket (UASB), which consists of a closed reactor where biological treatment takes place through an anaerobic process, i.e., without oxygen. Organic matter is decomposed by microorganisms found in a sludge layer. Sewage flows in underneath the reactor and passes through the sludge layer, which acts as an organic matter decomposing filter. Efficiency ranges from sixty (60) to seventy (70) percent, and, therefore, complementary/secondary treatment is needed to ensure increased efficiency and reach the parameters required by law. This treatment type is older, providing low efficiency, and ends up generating Greenhouse Gases—GHG, notably $CO_2$ (carbon dioxide) and $CH_4$ (methane).

Another technology used as primary sewage treatment is the Moving Bed Biofilm Reactor (MBBR). The MBBR system consists basically of a technology adapted to activated sludge systems, by introducing small low-density, large surface area plastic parts (biomedia) inside the aeration tank, acting as a support for the development of the biofilm, kept in constant circulation and mixing, either due to the introduction of diffused air or due to the existence of mechanic agitators, so as to improve their treatment performance. This type of technology is more current and efficient than the reactor (UASB), features a smaller footprint, has lower implementation costs, and does not generate Greenhouse Gases (GHG).

In research carried out in patent databases, the documents BR112019016535-5, PI 0620925-4, BR 102014030124-0, BR112015018299-2, and BR112019016535-5, among others, were found, addressing an MBBR (aerobic) reactor and the coupling between two MBBR (aerobic) reactors.

On the other hand, the most used complementary systems for secondary sewage treatment are decanting and flotation, where the flow treated primarily by the anaerobic reactor (UASB) or aerobic reactor (MBBR) is directed to a conventional decanting- or flotation-based physical-chemical treatment tank, where chemicals are used to coagulate and flocculate the pollution found in water, then this material is decanted or floated for later removal.

Both the UASB anaerobic reactor and the MBBR aerobic reactor work with variable flow, i.e., the incoming sewage flow is the same as the outgoing flow; therefore, the sewage flow leaving the UASB anaerobic reactor and the MBBR aerobic reactor must necessarily pass through an equalizer tank before reaching the secondary treatment at a decanting or flotation tank.

This equalization step is mandatory, so that the sewage flow entering the decanting or flotation tank is constant, since said conventional decanting or flotation systems do not operate with variable flow rates.

However, as most municipalities face difficulty in implementing a conventional WWTP due to the high implementation and operation costs, they often end up implementing only primary treatment, without building other tanks and interconnections for secondary treatment, precisely because of insufficient funding, which ends up harming the treatment of the sewage generated by cities, leading to the pollution of their water bodies.

The applicant is a specialist in water, sewage and watercourses treatment, having been granted more than thirty patents in this area.

His patents include documents PI 9702430-9, PI 010462-7, PI 0001458-3, C1 0001458-3, C2 00014583, among others, which are a reference in the market, as they can treat water, sewage, and watercourses in dynamic flow, with variable flow rates and levels.

Aware of the use of conventional reactors, both anaerobic (UASB), and aerobic (MBBR), for primary sewage treatment and their interconnection with other secondary treatments, the applicant has developed a new type of modified aerobic MBBR reactor (primary treatment), in conjunction with a modified decanting/flotation treatment system (secondary treatment with a tertiary level for removal of certain parameters), which, coupled through a continuous-, linear-treatment channel, with the flexibility of decanting- or flotation-based treatment, and with variable flow rate, can increase the treatment efficiency, eliminating equalization tanks, in addition to reducing the implementation and operation costs by reducing civil works—eliminating the need for building several treatment tanks and interconnections between them. In addition, sewage treatment will be more efficient, reaching higher pollution removal levels compared to conventional systems, due to new construction processes.

The concept of this new treatment process can also be applied to conventional WWTP currently in operation, as a way to increase efficiency and expand the treatment flow rate.

For existing treatment plants that use conventional anaerobic reactors (UASB), modifying these reactors is possible with little construction work, converting them into modified aerobic reactors (MBBR), coupling them to the flexible secondary treatment by modified decanting/flotation, with variable flow rate, eliminating the need for equalization tanks, expanding the treatment capacity of such plant, and reducing the operating cost.

Other existing treatment systems currently in operation can also be modified to increase treatment efficiency and flow rate e.g., aerated, optional, or anaerobic ponds, which with little construction work, can be converted into modified aerobic (MBBR) reactors, and said ponds so transformed into modified aerobic (MBBR) reactors may provide the primary treatment of sewage, which is then forwarded to secondary treatment, carried out by the flexible, modified decanting/flotation system, with variable flow rate, eliminating the need for equalization tanks.

OBJECTIVES OF THE INVENTION

Thus, the present patent is intended is to provide a sewage treatment process consisting of primary treatment performed by a modified aerobic (MBBR) reactor coupled with a flexible secondary treatment by a modified flotation/decanting system, in a continuous, linear treatment channel, with variable flow rate, to increase treatment efficiency and reduce implementation and operation costs.

A further objective is to promote changes to anaerobic (UASB) reactors existing at conventional treatment plants, in order to convert them into modified aerobic (MBBR) reactors, being used for primary treatment, and combine them with secondary treatment through the flexible, modified flotation/decanting system.

A further objective is to apply the modifications to existing treatment systems in operation, which can be modified for increased treatment efficiency and flow rate, e.g., aerated and optional ponds, through little construction work, where said aerated, optional, or anaerobic ponds are converted into modified aerobic (MBBR) reactors.

A further objective is to provide a process that enables a more efficient treatment for raw sewage, and allows accommodating seasonal variations in flow and raw sewage quality characteristics. Furthermore, it should allow a more appropriate operation based on the population flow variation. These variations are supported by the linear, continuous treatment process, with flexibility of action for decanting/flotation.

A further objective is to provide a sewage treatment process at an affordable cost to small towns, and yields significant savings for large municipalities, being easy to install, and may even operate in association with other existing facilities and processes, expanding the capacity thereof.

A further objective is to provide a sewage treatment process with a footprint that is smaller than that of conventional WWTP, in addition to using a smaller amount of input for the construction of tanks and pipes interconnecting them, thus generating less construction waste, in order to expand the possibilities of facilities and/or expansions.

A further objective is to provide a sewage treatment process that does not generate GHG (Greenhouse Gas) emissions, as it does not feature an anaerobic biological treatment system.

A further objective is to provide a sewage treatment process that is easy to maintain and clean.

Another advantage of the present process is the fact that the coagulation and flocculation steps are carried out with a pneumatic or aeration system, which allows precise, selective regulation of the energy, and, therefore, of the speed gradient throughout the whole coagulation pond, allowing the operator to reprogram, through the automation system, the fast and slow mixing energies, according to the characteristics of the raw sewage, the treatment flow rate, and the types of chemical products applied, unlike the state of art, where mechanical paddle mixers, which lack such flexibility and adaptability, are applied.

Another relevant aspect of the continuous, linear treatment process, with action flexibility for decanting/flotation, is that the channel width-to-length ratio is preferably in the order of magnitude of $1/10$, i.e., rectangular, which may vary depending on the case, but so as to allow proper dispersion of pollutant particles throughout the treatment process, preventing unfavorable phenomena from occurring, such as preferred paths that do not allow a suitable time for chemical reactions, as well as "dead" zones, where there the treatment effectiveness is low and pollutant precipitation is possible.

The continuous, linear treatment channel, as well as the modulation of the stages of the treatment process as a whole, solve one of the major drawbacks of conventional WWTP, which, due to their maintenance complexity, require at least two tanks for each treatment stage to allow that, while one of them is drained for cleaning and/or maintenance, the other(s) remain in operation, often in a critical or vulnerable condition, which may lead to operating interruptions, equipment wear and tear, and the treatment may prove to be inefficient for a certain period, which is very reckless for the operators of existing state-of-the-art systems, in view of the increasingly restrictive and punitive environmental regulations.

Another relevant aspect of the continuous, linear treatment process, in addition to the benefits already listed herein, is a very significant environmental gain, since it does not generate GHG (Greenhouse Gas) emissions, as its biological treatment system is not anaerobic. The Greenhouse Gases, notably $CO_2$ (carbon dioxide) and $CH_4$ (methane), which, once emitted, can remain in the atmosphere for decades or centuries, and whose concentrations become well mixed throughout the global atmosphere, irrespective of the emission source, and whose effects on climate are long-lasting, produce a warming effect, by capturing heat in the atmosphere, which would otherwise escape into space. Thus, considering that GHGs are toxic gases for the planet, causing a number of harmful effects, the application of the linear, continuous treatment process.

A further relevant aspect of the continuous, linear treatment process, with action flexibility for decanting/flotation, is the benefit of triggering the flotation step during rain events, when rainwater usually seeps into sewage network—in the case of the absolute separator system—, and the treatment flow rates at the WWTP increase significantly, allowing a single WWTP to operate more efficiently by decanting with a reduced flow rate during periods without rain, or with the flotation stage during rainy events, or even during peak pollutant loads, whether due to clandestine disposal, seepage into the network due to environmental accidents, or even misuse of the public sewage system by users.

Another relevant aspect of the continuous, linear treatment process is the benefit of promoting changes in the existing anaerobic reactors (UASB) of conventional WWTP, in order to convert them into modified aerobic reactors (MBBR), being used as primary treatment, and join them to the flexible secondary treatment by the modified flotation/decanting system.

Other existing treatment systems currently in operation can also be modified to increase treatment efficiency and flow rate, e.g., aerated, optional, or anaerobic ponds, which with little construction work, can be converted into modified aerobic (MBBR) reactors, and said ponds so transformed into modified aerobic (MBBR) reactors may provide the primary treatment of sewage, which is then forwarded to secondary treatment, carried out by the flexible, modified decanting/flotation system, with variable flow rate, eliminating the need for equalization tanks.

As an alternate embodiment, the implementation of a last optional stage for disinfection of treated sewage is provided.

Thus, combining the steps that make up the treatment process and the intrinsic features of this invention allows a better overall result, considering the technical, economic, and environmental aspects, compared to the state of the art.

BRIEF DESCRIPTION OF THE INVENTION

In view of the aforementioned inconveniences seen in the prior art, concerning the conventional treatment of sewage by anaerobic and/or aerobic primary treatment reactors—UASB and MBBR, and secondary treatment by decanting and flotation, and in order to overcome these, and in order to meet the listed objectives, the sewage treatment process was developed in a continuous, linear channel, through a modified aerobic reactor (MBBR), coupled with a flexible system by decanting/flotation, or conversion of an existing anaerobic reactor (UASB) into a modified aerobic reactor (MBBR), coupled with a flexible decanting-/flotation-based system, in addition to retrofitting an aerated, optional or anaerobic sewage pond into a modified aerobic reactor (MBBR), also coupled with a flexible decanting-/flotation-based system.

Said modified continuous, linear treatment channel with flexibility for decanting/flotation action, addressed by this invention, can be straight or curved to better suit the terrain available for deployment, occurring continuously through its treatment steps, through a modified aerobic reactor (MBBR), followed by modified decanting/flotation, which consist of the same area of the continuous treatment channel, differing only in the operation of certain devices, at the choice of the process operator, meeting the need of the type of treatment to be carried out, allowing better adjustment to the sewage treatment operation (by flotation, decanting, or both) and also in relation to seasonal variations in flow rates and characteristics of raw sewage, and a more appropriate operation based on the population flow variation, among other parameters observed by the process operators.

Along the continuous, linear, and flexible channel, the following treatment stages operate: (a) garbage removal at the garbage grid stage; (b) silt and sand removal at the sandbox stage; (c) primary treatment by a modified MBBR reactor; (d) flexible, modified secondary treatment by decanting/flotation; (e) scraping and removal of the flotation sludge, when the process operates with the flotation step; (f) suction and removal of the decanted sludge when the process operates with the decanting stage; (g) eventual disinfection of the treated sewage, when necessary.

The continuous, linear, and flexible sewage treatment process operates with variable flow rate, i.e., the incoming flow rate is the same as the outgoing flow rate; therefore, the sewage flow leaving the modified aerobic reactor (MBBR) does not necessarily pass through an equalization tank before reaching the flexible, modified secondary treatment by settling/flotation. Since this is a continuous, linear, and flexible channel treatment, this process has a smaller footprint than conventional WWTP, in addition to using less input for the construction of tanks and interconnecting pipes, thus generating less construction waste, in order to expand the installation and/or expansion possibilities.

The continuous, linear, and flexible sewage treatment process, obtained by using the new treatment process in question, allows operation by decanting as one of the treatment stages, with a variable nominal flow rate from 0 (zero) to "X" (sizing flow rate) and/or with the flotation stage with a nominal flow of 0 (zero) to at least "2X" (twice the sizing flow rate of the decanting stage), i.e., at least two times higher compared to decanting, which allows triggering flotation in peak flow rate or peak pollutant load events, due to its greater efficiency in removing pollutants, ensuring the treatment effectiveness, in addition to saving natural resources by reducing the use of chemical products, thus contributing to the environment preservation, which is also a great benefit for estuary and tourist zones with a floating population and do not require a large-scale system to operate at peak flow rates for short intervals of time, reducing the total investment.

Both treatment stages—decanting or flotation—allow treating flow rates from zero to the sizing flow rate of X or 2X, respectively, since the process features an appropriate suction device for the decanted sludge at the bottom of the treatment channel, and for scraping and removal of the floating sludge, which can operate with variable flow rates and levels, enabling the appropriate, efficient removal of decanted or floated waste, even with water level variations due to flow rate variation, a very important and innovative feature of the process.

This process also provides an own lifting device, consisting of an overhead crane, which is used to remove garbage and sand retained, respectively, on the garbage grid and sandbox, as well as the floated sludge scraping to the floating dredging wheel, in addition to the eventual removal of the defective equipment installed at the treatment channel, allowing their removal from of the channel and unloading at a yard or directly on a truck to be sent for maintenance.

The overhead crane features a rail that moves transversely to the linear channel, allowing positioning for lifting at any point of interest within the treatment plant, which provides extremely easy maintenance, whether performed on site or, if necessary, led to the appropriate workshop and, consequently, replacing the damaged equipment with other identical or even more modern equipment, which may also be available on site, which also allows modernizing the WWTP innovated hereunder, as more advanced equipment and materials emerge, without the need for construction work, and even without halting the treatment process.

During the continuous, linear treatment process, with flexibility for decanting/flotation action, the possibility of installing a power generating system in case of power outage—preferably solar or renewable energy—is also provided, enabling the process continuity. At conventional WWTP, a power outage causes a number of inconveniences, particularly to chemical processes that cannot be interrupted and resumed without damage, for example, clots and flakes decanting in the respective tanks; after a few events of this type at conventional WWTP, decanted material becomes accumulated at these treatment stages, which starts to cumulatively impair its operation. As for the present invention, even without the power generator system, the process allows removing the decanted waste at any stage of the system, including the coagulation and flocculation stages, which also stands out as another benefit of this process, of a primarily operational nature, also serving as a contingency to remedy flaws in the treatment process.

Inside the modified aerobic reactor (MBBR), walls that form channels (baffles) are introduced, which can be made of any waterproof and resistant material. At the bottom of the modified MBBR aerobic reactor, aerators are installed, whose function is to stir the biomedia inside the modified MBBR aerobic reactor, in order to carry out the primary treatment of said organic sewage.

The bottom aerators are also enriched with oxygen to maximize the primary treatment of sewage, since oxygen enhances the action of the bacteria attached to the biomedia.

At the passageways of the walls that form the channels (baffles) inside the modified aerobic reactor (MBBR), cage-shaped traps are installed to prevent said channels from stirring the biomedia, ensuring that all organic sewage is reached by the oxygen-enriched aeration, with no "dead" zones.

These cage-shaped traps are laid out within the channels (baffles) existing inside the modified aerobic reactor (MBBR), and said cage-shaped traps allow the passage of sewage being treated, and prevent the displacement of biomedia through the channels, ensuring the treatment of the entire organic sewage flow that enters the aerobic reactor (MBBR), increasing the effectiveness of this reactor.

At existing treatment plants, an aerated pond, an optional pond or an anaerobic pond may be retrofitted to become modified aerobic reactors (MBBR), simply by installing the aerators at the bottom of said pond; by installing the internal walls to form channels (baffles) inside the pond; by installing cage-shaped traps at the channel passageways to retain biomedia or use the biomedia trapped in the cage-shaped traps along said channels. The sewage flow is introduced into the pond by a single pre-determined inlet, and the oxygen-enriched bottom aerators stir the biomedia, and the biomedia is retained by the cage-shaped traps, not dispersing along the canals, moving inside its confinement area.

Also at existing treatment plants that feature an anaerobic reactor (UASB) for the primary treatment of sewage, its conversion into a modified aerobic reactor (MBBR) is provided, by removing the entire inside part of said anaerobic reactor (UASB), with the installation of bottom aerators, inside walls to form flow-directing channels (baffles), and the installation of cage-shaped traps at the passageways of these channels, for biomedia confinement.

After the primary treatment, the sewage flow of any kind from the modified aerobic reactor (MBBR) is forwarded—without the need to pass through an equalization tank—to the flexible secondary treatment system by flotation/decanting.

Depending on seasonality, increased treatment flow rate and quality of the incoming sewage, secondary treatment is be carried out by the coagulation and flocculation stages, by mixing the coagulant and flocculant through aeration, followed by flotation, decanting, or both; removal of the floated sludge and passage of the treated water, or removal of the decanted sludge, with the stages of coagulation, flocculation, decanting, removal of the decanted sludge, and passage of the treated sewage.

The sludge removed by this process can be recycled and reused in the most diverse activities, such as composting and reforestation, as long as it does not contain industrial pollution.

After sludge removal, the treated sewage follows the continuous flow until the end of the continuous, linear, and flexible channel, being eventually subjected to a disinfection stage with sodium hypochlorite or other oxidizing agent, also passing by channels (baffles) laid out inside the primary channel until the outlet, and the treated sewage moves to the receiving water body, such as a river or lake.

The present process features relatively low implementation and operation costs, and can be implemented at new plants or existing facilities, with the increase of their treatment capacity.

DESCRIPTION OF THE FIGURES

Augmenting the present description, so as to provide better understanding of the features hereof, and pursuant to a preferred embodiment hereof, the description is followed by a set of drawings, where, as an example, although not limiting, the following was depicted:

FIG. 9 illustrates a cross-section, according to indication "B-B", of the treatment process in the form of a continuous, linear, and flexible channel;

FIG. 10 illustrates a cross-section, according to indication "C-C", of the treatment process in the form of a continuous, linear, and flexible channel, with the longitudinal septum;

DETAILED DESCRIPTION OF THE SUBJECT MATTER

Figure 1A:
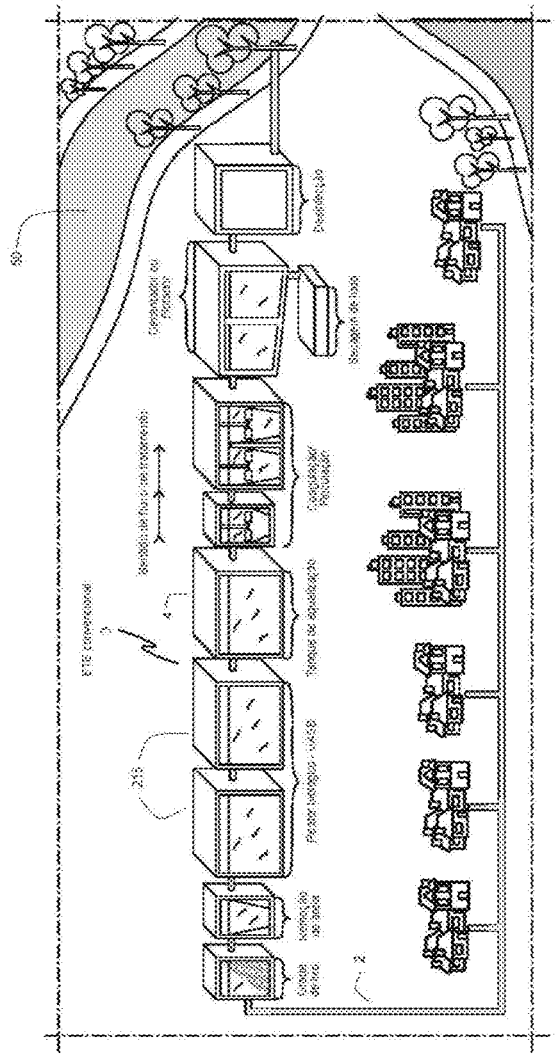
FIG. 1A illustrates the stages of Wastewater Treatment Plants—conventional WWTPs in the State of the Art, with preliminary, primary, and secondary treatment.

As illustrated in the figures above and provided in the invention, the "Process for sewage treatment in a continuous, linear, and flexible channel, through a modified aerobic biological reactor system, or conversion of an existing anaerobic biological reactor into a modified aerobic biological reactor, coupled with a modified flexible flotation/decanting system", intended for sewage treatment (2), to be carried out at a treatment plant, through a continuous, linear and flexible channel (1), using, as preliminary treatment (100), a garbage grid (105) and a sandbox (110) to remove such debris, followed by primary treatment (200), where the sewage (2) receives said primary treatment (200) inside a modified aerobic reactor (MBBR) (205), or inside an aerated, optional, or anaerobic pond (210) converted into a modified aerobic reactor (MBBR) (205), or even inside an anaerobic reactor (UASB) (215) converted into a modified aerobic reactor (MBBR) (205), followed by secondary treatment (300) consisting of a flexible, modified decanting/flotation system (305), where said primary treatment (200) consisting of oxygen-enriched aeration (220), which stirs the biomedia (225) inside the modified aerobic reactor (MBBR) (205) of the aerated, optional, or anaerobic pond (210) converted into a modified MBBR aerobic reactor (205), or even the anaerobic reactor UASB (215) converted into a modified MBBR aerobic reactor (205), where, after the primary treatment (200), the sewage (2) from said primary treatment (200) is directed to the secondary treatment (300) without the need to pass through an equalization tank (4), where it receives the treatment by a flexible, modified decanting/flotation system (305).

The preliminary treatment (100) consists installing in the sewage flow channel (2) a grid (105) to trap the solid waste—both superficial and submerged—and a sandbox (110) to trap sand and silt, where said sandbox (110) consists of mobile sand traps (115) equipped with an upper lifting cable (120), whose upper end is provided with a float (125) for flotation above the sewage flow (2) level, to be removed by the overhead crane-type lifting, device (5).

The modified aerobic reactor (MBBR) (205) consists of the installation of impermeable walls (230) inside it, forming channels (baffles) (235) inside the modified aerobic reactor (MBBR) (205) itself, so as to direct the sewage flow (2) from the inlet (206) of the modified aerobic reactor (MBBR) (205) to the outlet (207) of the modified aerobic reactor (MBBR) (205), so that all sewage flow (2) receives the primary treatment (200) and allows the proper dispersion of the polluting particles along the continuous, linear channel (1) of the treatment process, preventing unfavorable phenomena such as preferential paths that prevent the appropriate times for chemical reactions, also preventing "dead" zones, where treatment is less effective and the precipitation of pollutants in the channel is possible.

In the passageways of the impermeable walls (230) that form the channels (baffles) (235) inside the modified aerobic reactor (MBBR) (205), cage-shaped traps (240) are installed to contain the biomedia (225) and prevent said biomedia (225) from being carried forward by the flow of said channel and passing to the next treatment stage, ensuring that all sewage (2) is reached by oxygen-enriched aeration (220) and biomedia (225). These cage-shaped traps (240) also serve to allow the biomedia (225) removal from the treatment channel (1) for maintenance or parts replacement, through the overhead crane-type lifting device (5).

These cage-shaped traps (240) are provided, at their top portion, with supports (245) for lifting and removal.

The thick-bubble aerator pipes (310), arranged at the bottom of the sewage flow channel (secondary treatment (300)), are provided with an upper cable (315) for lifting, whose upper end is provided with a float (320) for fluctuation above the sewage flow (2) level, for removal by the overhead crane-type lifting device (5).

The decanted sludge (340) suction pipes (325) are also provided with an upper cable (330) for lifting, whose upper end is provided with a float (335) for flotation above the sewage flow level, for removal by the overhead crane-type lifting device (5).

The overhead crane-type lifting device (5) travels along the entire length of the continuous, linear, and flexible channel (1) from upstream of the preliminary treatment stage (100), to downstream of sewage outlet (30 or 40), then to the receiving water body (50), through rails (10) installed on the sides of said continuous, linear, and flexible channel (1), being used to remove garbage and sand trapped respectively in the garbage grid (105) and sandbox (110), provided at the preliminary treatment stage (100), as well as the potential removal of damaged equipment installed in the treatment channel (1), allowing that this equipment is led out of the channel (1) and unloaded at a yard or directly onto a truck to be sent for maintenance. The overhead crane-type lifting device (5) also features a displacement rail (11) arranged transversely to the continuous, linear, and flexible channel (1), where the lifting device (12) itself is fastened, allowing positioning for lifting at any point of interest within the treatment plant (1), which provides extremely easy maintenance, whether on site or, if necessary, at the appropriate workshop, and, consequently, replacing the damaged equipment with other identical or even more modern equipment, which can even be available on site, which still allows modernizing the now innovated WWTP, as more advanced equipment and materials emerge, without the need to carry out construction work, and even without shutting down the treatment process.

The overhead crane-type lifting device (5) also features, at its bottom, a retractable scraper device (15), which extends to below the sewage flow level (2), to scrape the surface sludge (20) and forward such surface sludge (20) to the dredging wheel (25).

After the preliminary treatment (100), the sewage (2) enters (206) through the internal channels (baffles) (235) located inside the modified aerobic reactor (MBBR) (205), being conducted through the cage-shaped traps (240) of biomedia (225) and through the oxygen-enriched aerators (220) installed at the bottom of said modified aerobic reactor (MBBR) (205), until reaching the outlet (207) of the modified aerobic reactor (MBBR) (205) and moving to the next treatment stage.

The aerators (220) installed at the bottom of the modified aerobic reactor (MBBR) (205) also play the role of stirring the biomedia (225) inside the cage-shaped traps (240), inside the modified aerobic reactor (MBBR) (205), in order to provide the primary treatment (200) of said organic sewage (2).

The bottom aerators (220) are enriched with oxygen to maximize the primary treatment (200) of sewage (2), since oxygen enhances the action of the bacteria adhered to the biomedia (225) in the form of bacterial colonies.

At conventional Wastewater Treatment Plants (WWTPs) (3) in operation, which feature anaerobic reactors (UASB) (215), the present process provides the conversion of such anaerobic reactors (UASB) (215) into modified aerobic reactors (MBBR) (205), by removing the entire inside part of said anaerobic reactor (UASB) (215), followed by the installation of aerators (220) at the bottom of said reactor (215); the installation of the impermeable internal walls (230) in order to form channels (baffles) (235) inside the reactor; and the installation of cage-shaped traps (240) at the passageways of the channels (baffles) (235) to trap the biomedia (225) along said channels. The sewage flow (2) enters the anaerobic reactor (UASB) (215) already converted into a modified aerobic reactor (MBBR) (205) through a single predetermined inlet (206), and the oxygen-enriched bottom aerators (220) stir the biomedia (225), and the biomedia (225) is trapped by the cage-shaped traps (240), not dispersing along the channels (235), and said biomedia (225) move only within the cage-shaped traps (240).

Again at conventional Wastewater Treatment Plants (WWTPs) (3) in operation, the present process provides the retrofitting of the aerated, optional, or anaerobic ponds (210) into a modified aerobic reactor (MBBR) (205), with the installation of aerators (220) at the bottom of said ponds (210); the installation of impermeable internal walls (230) so as to form channels (baffles) (235) inside the ponds (210); and the installation of cage-shaped traps (24) at the passageways of the channels (baffles) (235) to trap the biomedia (225) along said channels (235). The sewage flow (2) enters the pond through a single predetermined inlet (206), and the oxygen-enriched bottom aerators (220) stir the biomedia (225), and the biomedia (225) is trapped by the cage-shaped traps (240), not dispersing along the channels (235), and said biomedia (225) move only within the cage-shaped traps (240).

After the primary treatment (200), the sewage flow (2) from the modified aerobic reactor (MBBR) (205), from the aerated, optional, or anaerobic pond (220) already converted into a modified aerobic reactor (MBBR) (205), or even from the anaerobic reactor (UASB) (215) already converted into a modified aerobic reactor (MBBR) (205), is sent—without the need to pass through an equalization tank (4),—to secondary treatment (300) through the flexible, modified decanting/flotation system (305), where the sewage (2)—depending on the season, increased treatment flow rate, and quality of the incoming sewage (2)—is treated by the coagulation (345) and flocculation (350) stages with a mixture of coagulant and flocculant through aeration (310), followed by flotation or decanting (305), removal of the floated sludge (20) or decanted sludge (340), and passage of the treated sewage (30).

As a constructive alternative, the continuous, linear, and flexible channel (1) at the flexible, modified secondary treatment stage (300) by decanting/flotation may include at least one longitudinal septum (360) arranged in a centralized or decentralized manner in relation to the channel; this longitudinal septum (360) is arranged along the inside area of said channel to form at least two parallel linear channels, called sub-channels (361 and 362), allowing their use for various purposes, e.g., one sub-channel (361 or 362) operating with decanting and the other sub-channel (361 or 362) operating with flotation, allowing increased refinement in the choice of processes, ensuring increased cost-effectiveness, with the possibility of installing independent gates (364) at the inlets of said sub-channels (361 and 362), for individual flow rate control.

Said split of the sewage flow (2) channel (1) into two sub-channels (361 and 362) by she longitudinal septum (360) allows using a sub-channel (361 or 362) for sewage treatment (2), while the other sub-channel (361 or 362) does not operate, saving power from the equipment, so that it does not operate idly, as in low treatment flow rate scenarios.

The floated sludge (20) is driven by the flow of the channel (1), being aided by the retractable scraper device (15) existing on the overhead crane-type lifting device (5), and this sludge (20) is removed from the channel through a dredging wheel (25) installed downstream from the flotation/decanting stage (305), and can be recycled and reused in the most diverse activities, such as composting and reforestation, as long as it does not contain industrial pollution.

The decanted sludge (340) is removed from the channel (1) through a suction device (325) installed at the bottom of said channel, and can be recycled and reused for various activities, such as composting and reforestation, provided that it does not contain industrial pollution.

After the floated sludge (20) and/or decanted sludge (340) is removed, the treated sewage (30) follows the continuous flow until the end of the continuous, linear, and flexible channel (1); as a constructive alternative, an additional disinfection stage (400), using sodium hypochlorite or another oxidizing agent (405), may be included, where the sewage already treated (30) at the previous stages (100, 200 and 300) passes through channels (baffles) (410) arranged inside the primary channel (1), where it is provided said disinfection treatment (405) with sodium hypochlorite or another oxidizing agent, until the outlet, following the treated and disinfected sewage (40) to the receiving water body (50), such as a river or lake.

Within the basic construction described above, we claim a continuous-, linear-, flexible-channel sewage treatment process, through a modified aerobic biological reactor system, or transformation of an existing anaerobic biological reactor into a modified aerobic biological reactor, coupled with a modified flexible flotation decanting system, the subject matter of this patent, which may be modified in terms of construction, sizing, materials, functional configurations, and process stages and parameters without departing from the patent protection scope.

Figure 1B:
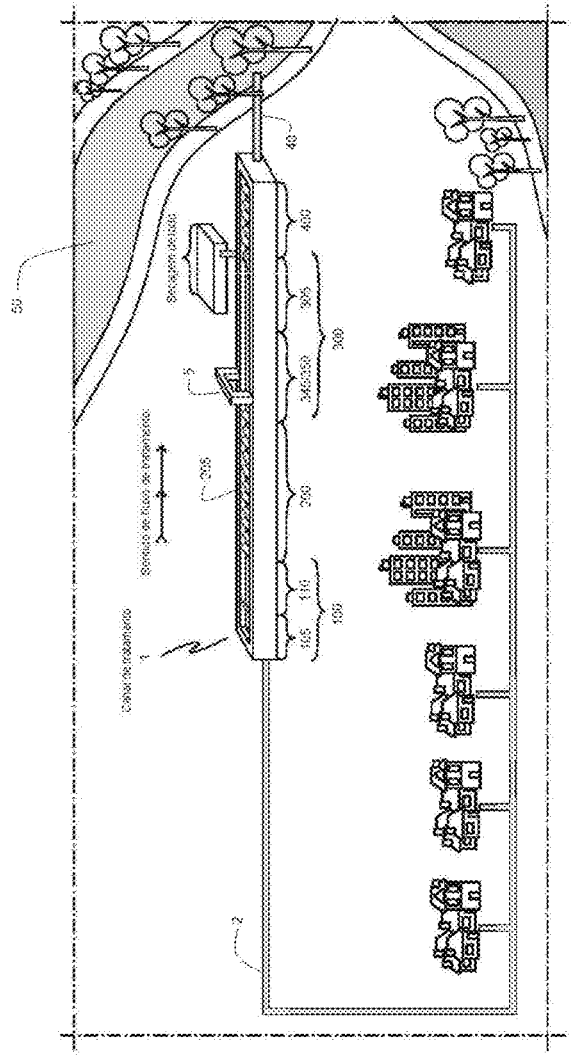
FIG. 1B illustrates the treatment process in the form of a continuous, linear, and flexible channel, sized to work with a sewage flow rate equivalent to that treated at a conventional WWTP.
Figure 2A:
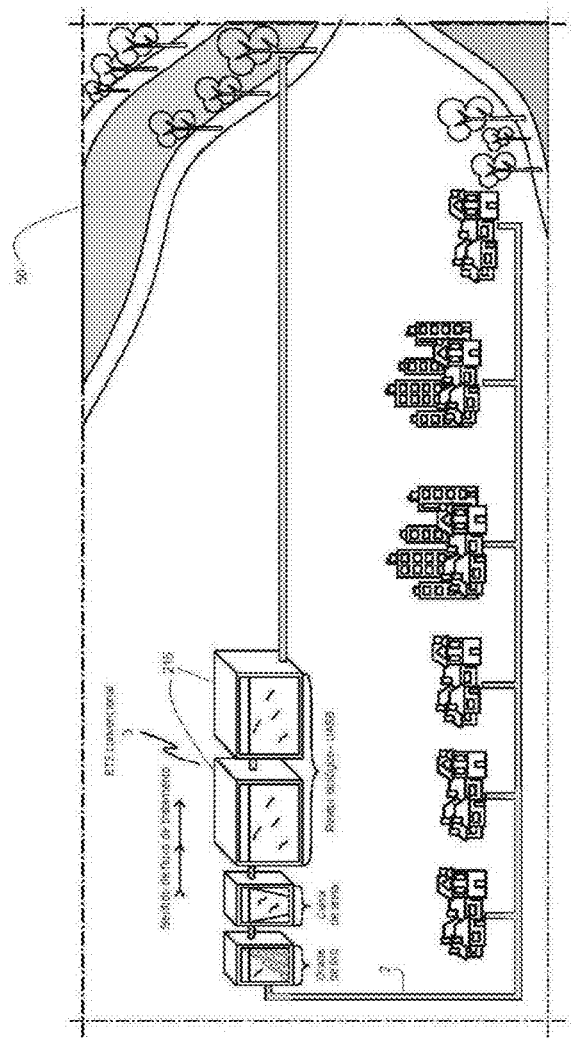
FIG. 2A illustrates the stages of Wastewater Treatment Plants—conventional WWTPs in the State of the Art, with preliminary, primary treatment only, through UASB reactors.
Figure 2B:
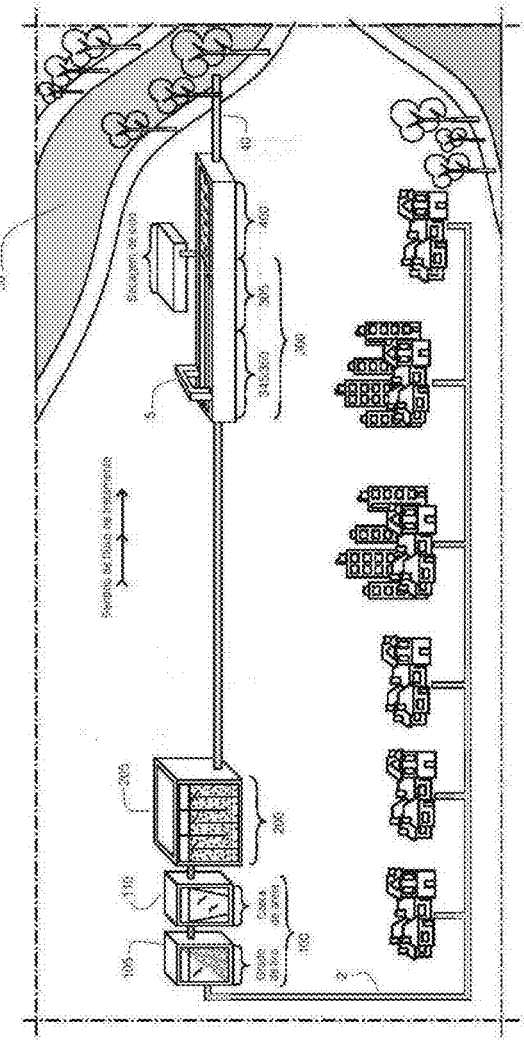
FIG. 2B illustrates the conventional WWTP with a UASB anaerobic reactor already transformed into a modified MBBR aerobic reactor, combined with the continuous, linear, and flexible channel.
Figure 3A:
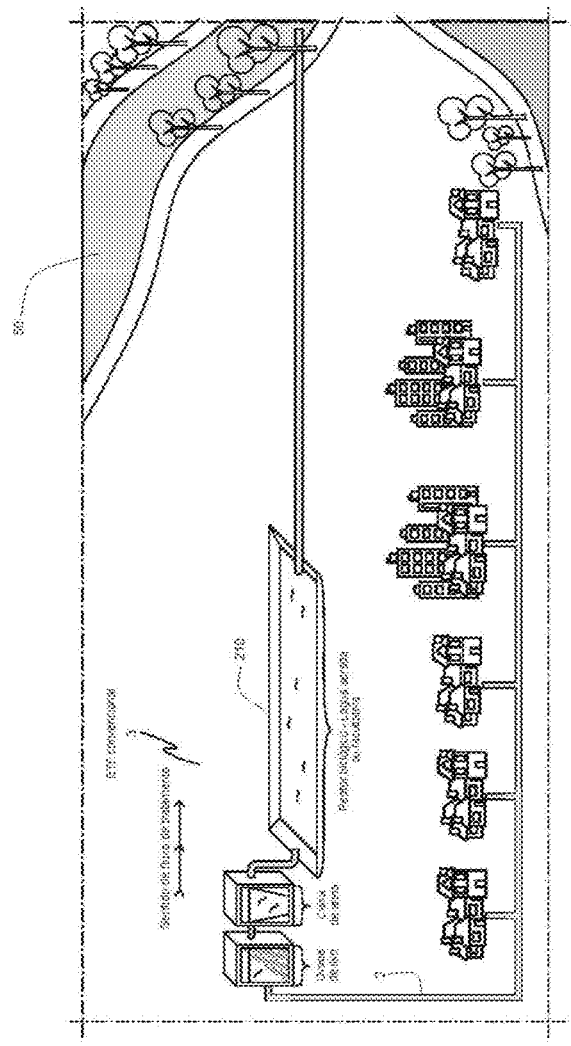
FIG. 3A illustrates the stages of conventional Wastewater Treatment Plants (WWTPs) at the State of the Art with only preliminary and primary treatment by aerated, optional, or anaerobic pond.
Figure 3B:
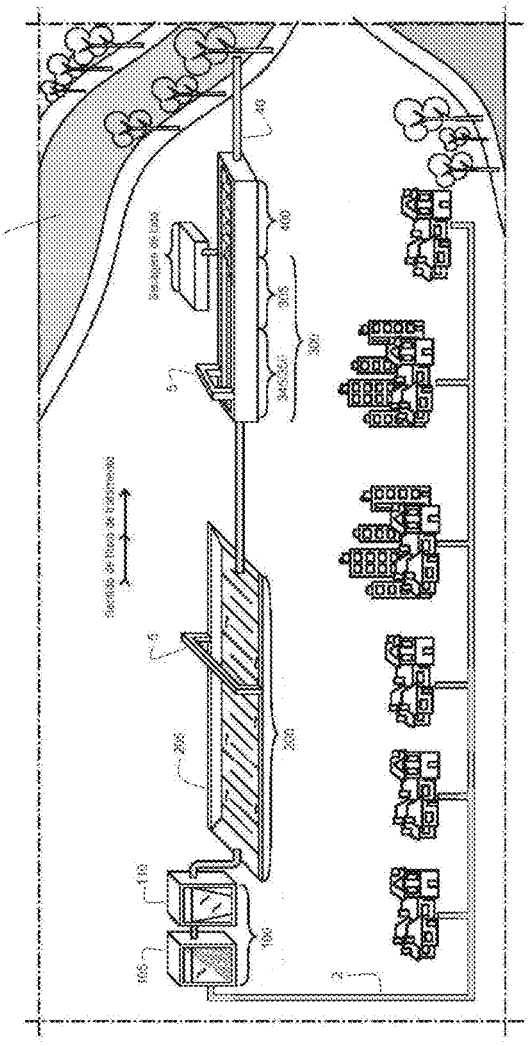
FIG. 3B illustrates the conventional WWTP with the aerated, optional, or anaerobic pond already transformed into an aerobic MBBR reactor, combined with the continuous, linear, and flexible channel.
Figure 4:
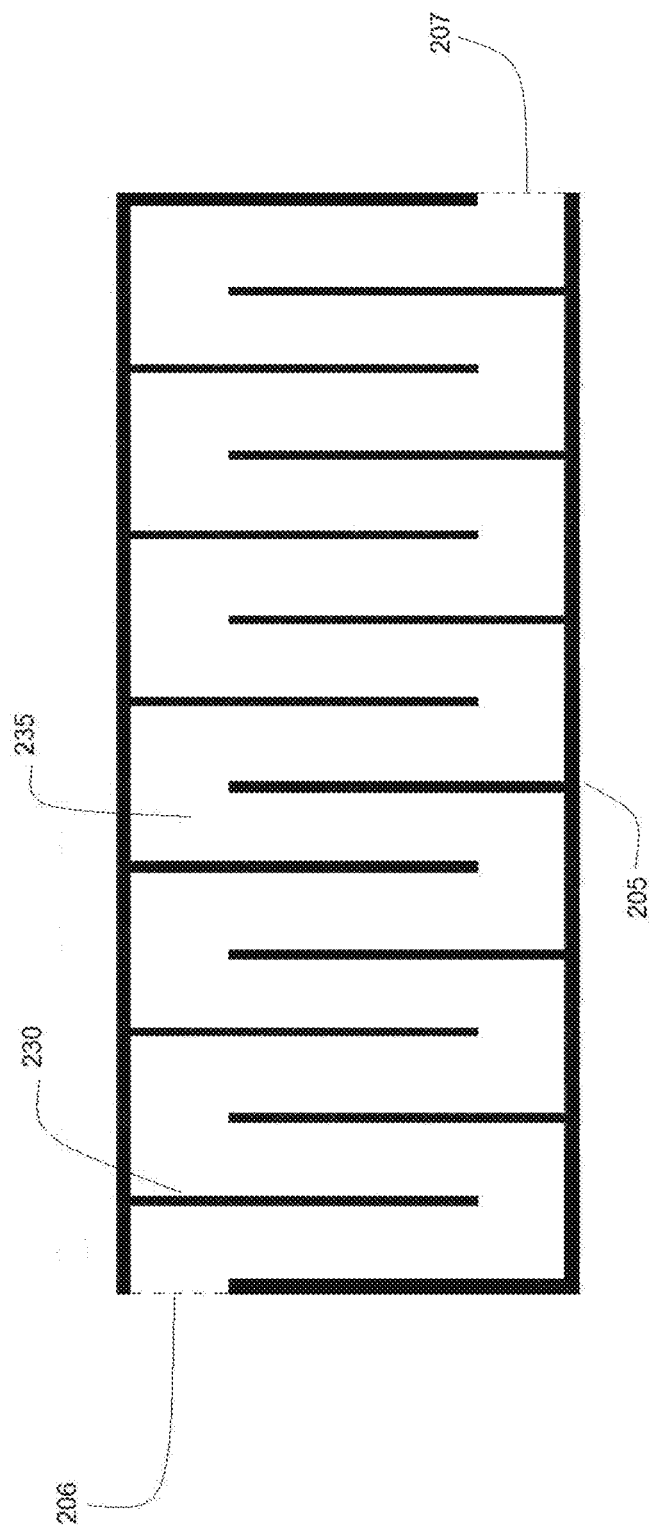
FIG. 4 illustrates the inside of the modified MBBR reactor, with its channels (baffles)
Figure 5:
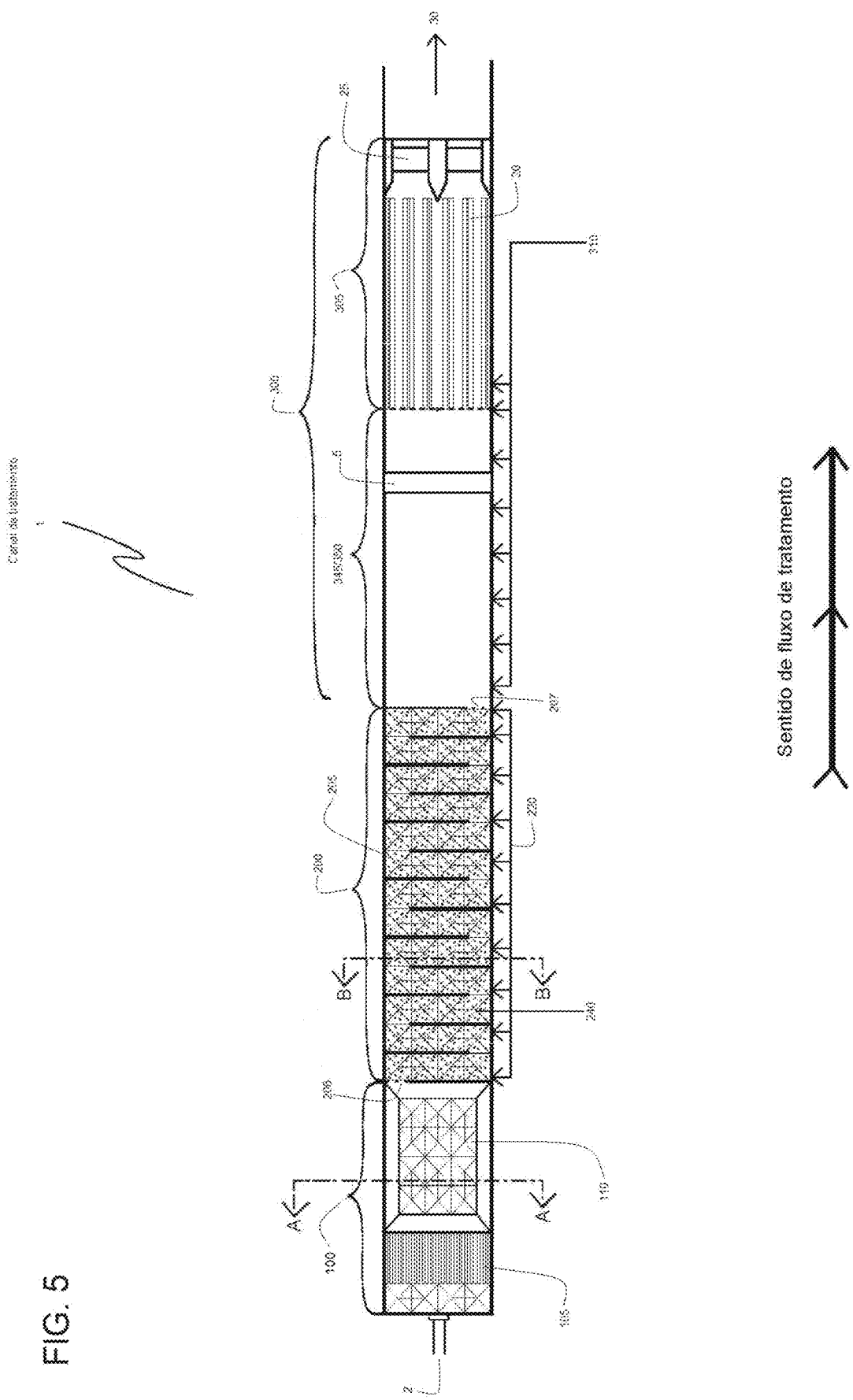
FIG. 5 illustrates a top view of the treatment process stages in a continuous, linear, and flexible channel, without the optional disinfection stage.
Figure 6:
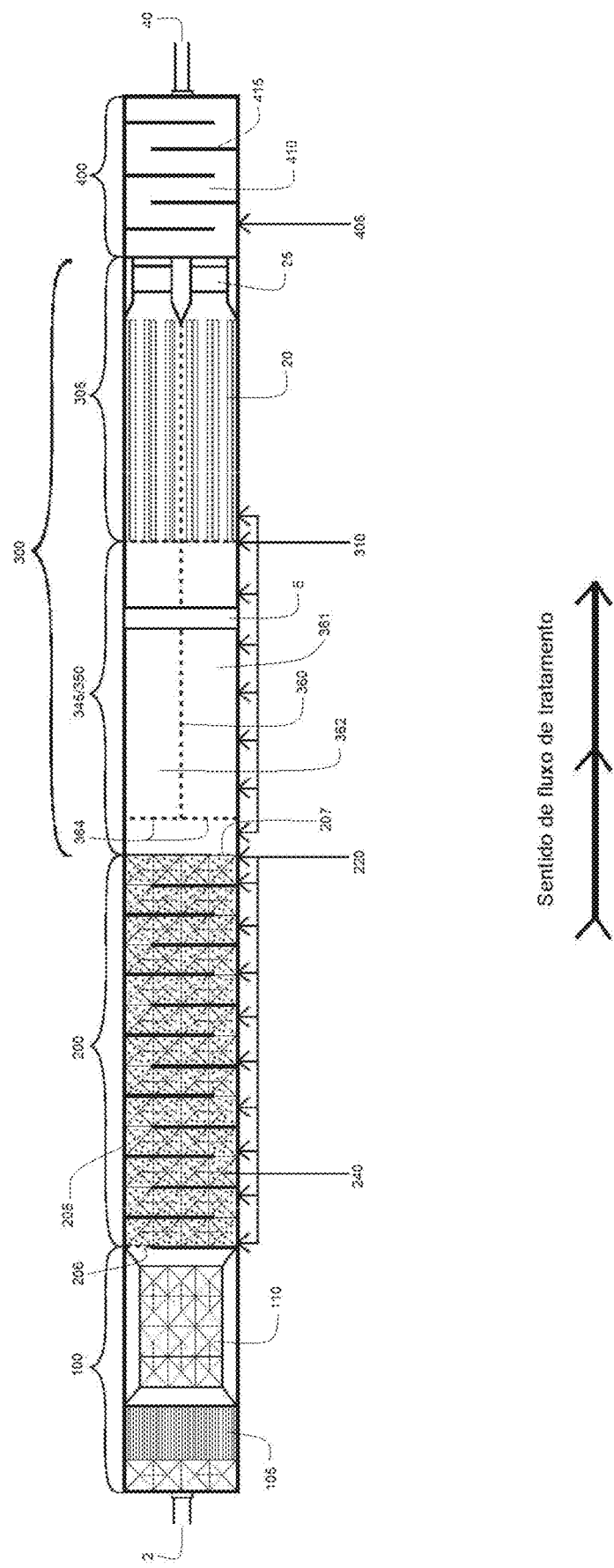
FIG. 6 illustrates a top view of the treatment process stages in a continuous, linear, and flexible channel, with the optional disinfection stage.
Figure 7:
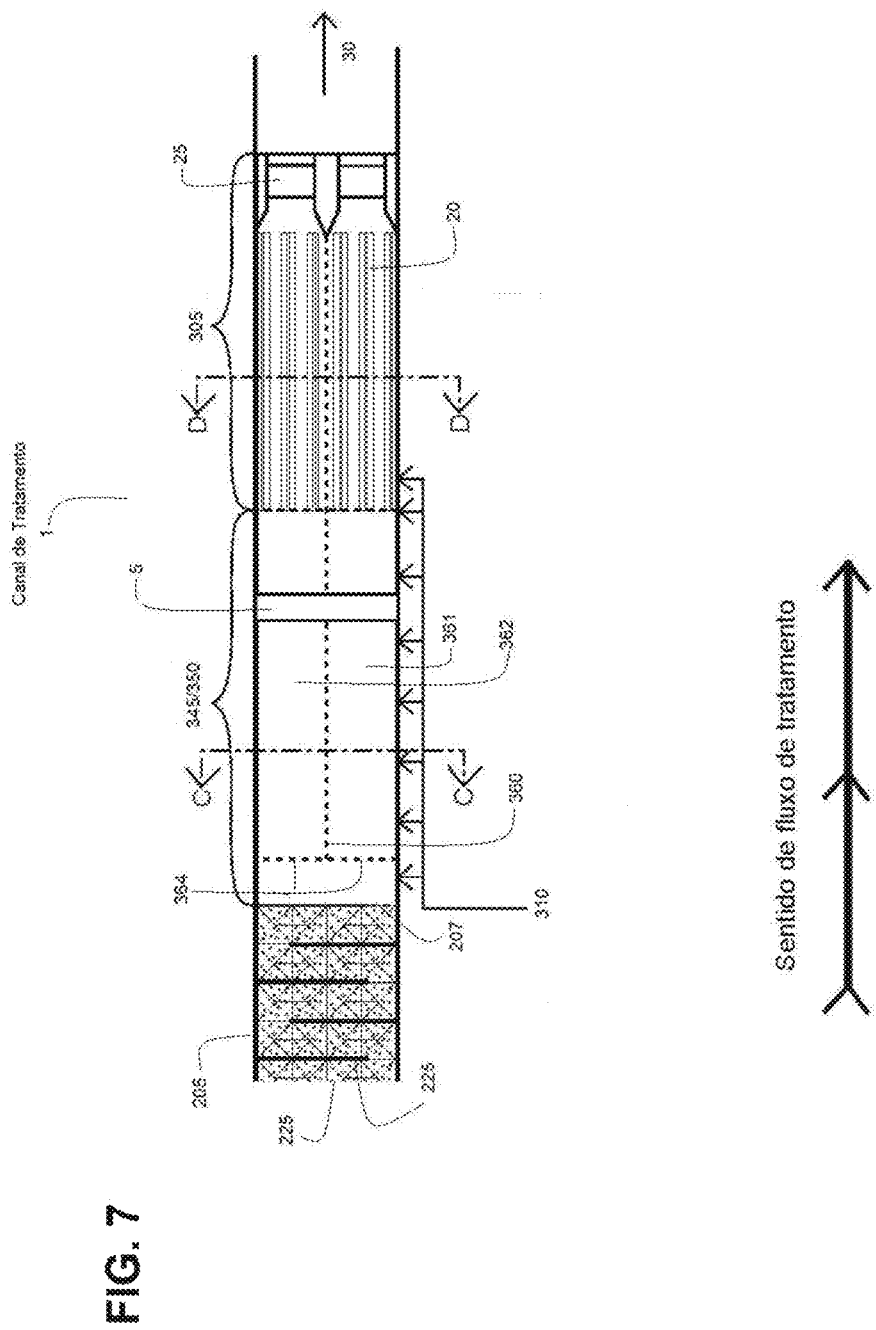
FIG. 7 illustrates a top view of the continuous, linear, and flexible channel, with the longitudinal septum.
Figure 8:
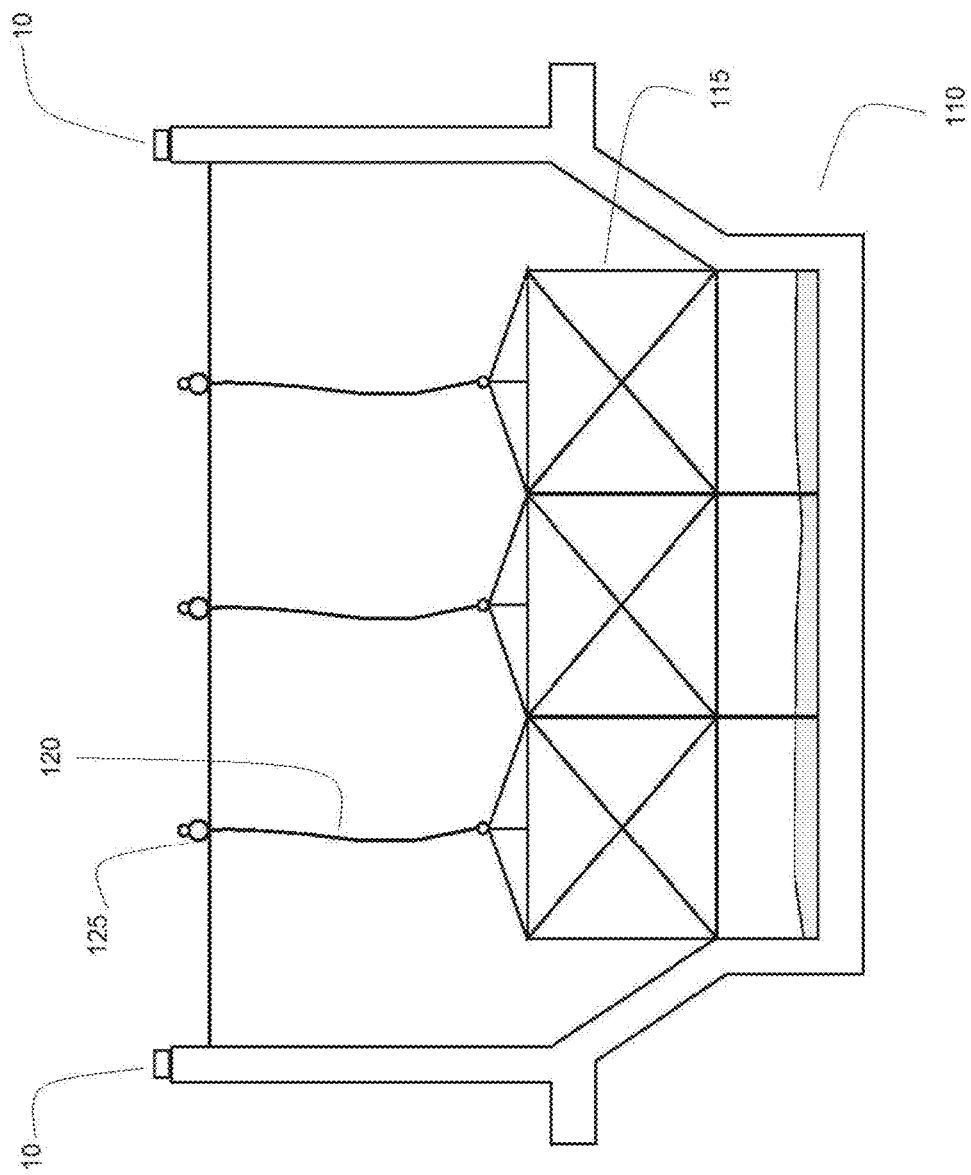
FIG. 8 illustrates a cross-section, according to indication "A-A", of the treatment process in the form of a continuous, linear, and flexible channel, observing the mobile sand traps.
Figure 11:
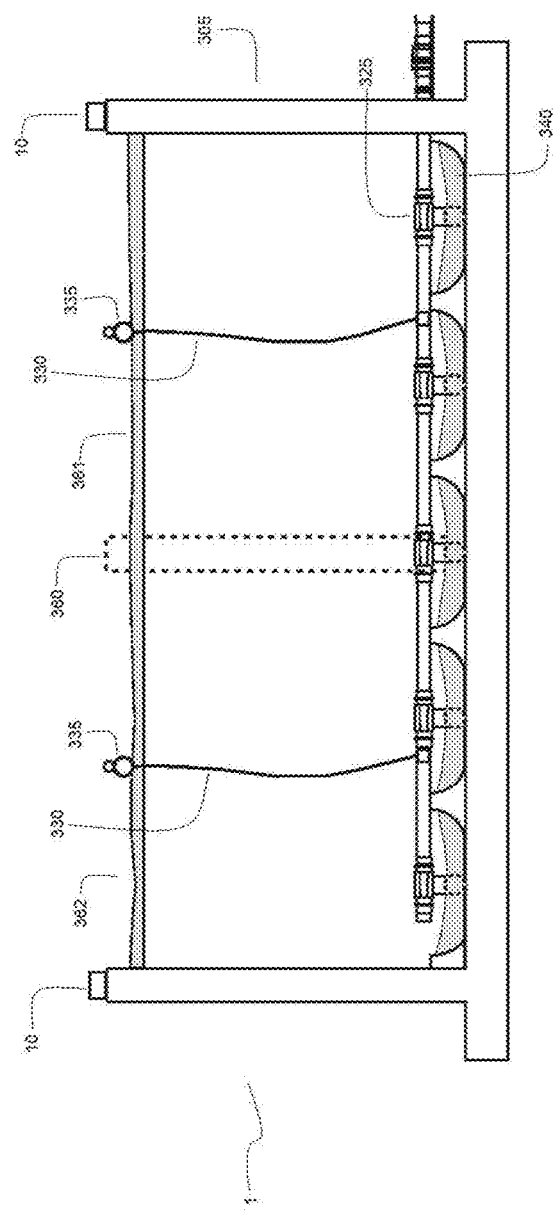
FIG. 11 illustrates a cross-section, according to indication "D-D", of the treatment process in the form of a continuous, linear, and flexible channel, with the longitudinal septum.
Figure 12:
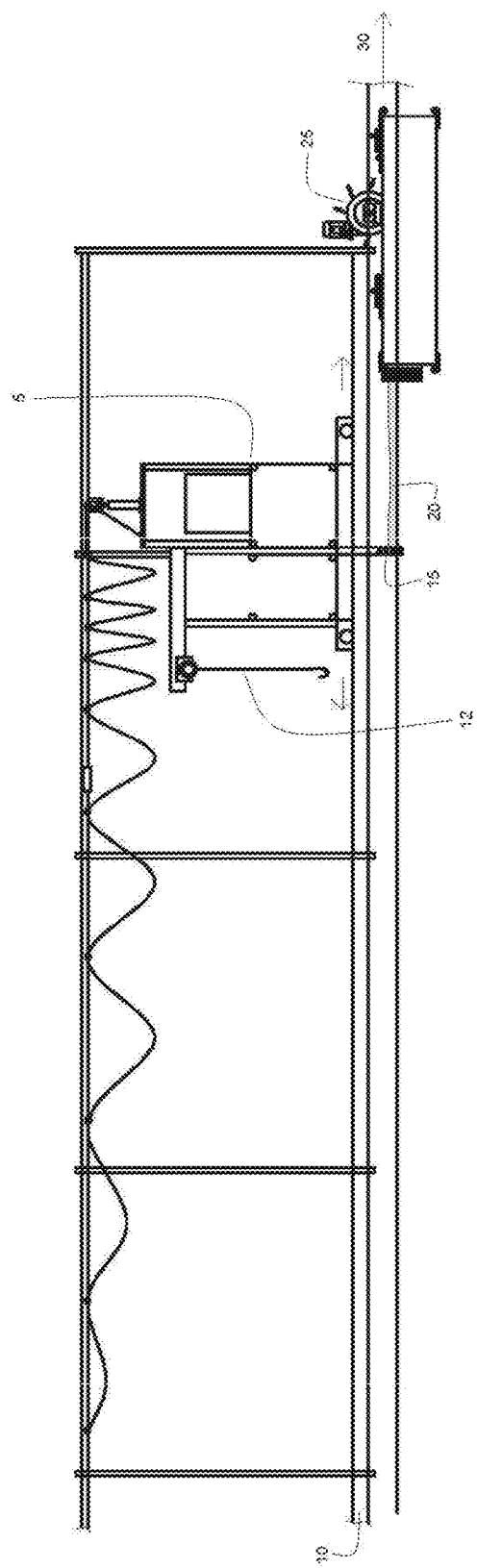
FIG. 12 shows a schematic and side view of the overhead crane-type lifting device, and the floating sludge dredging wheel.
Figure 13:
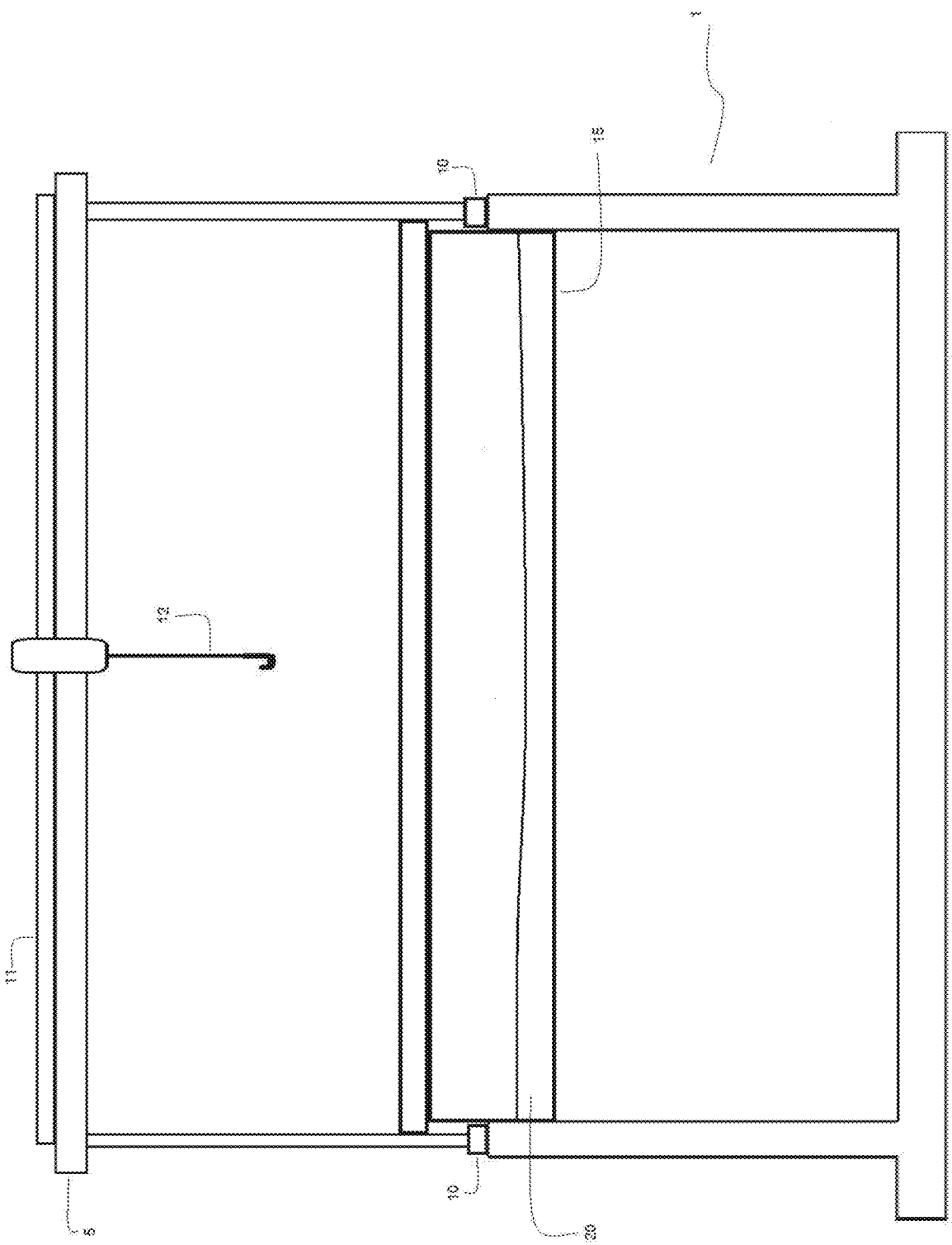
FIG. 13 illustrates a side view of the overhead crane-type lifting device, with the transverse rail, lifting winch, and scraper.

[Illegible content].
FIG. 1B.
[It bears a picture].
[Illegible content].
2/11.
FIG. 2A.
[It bears a picture].
[Illegible content].
FIG. 2B.
[It bears a picture].
[Illegible content].
3/11
FIG. 3A.
[It bears a picture].
[Illegible content].
FIG. 3B.
[It bears a picture].
[Illegible content].
4/11.
FIG. 4.
[It bears a picture].
206-230-235.
205-207.
5/11.
FIG. 5.
[It bears a picture].
Treatment channel.
1-2-100-A-206-B-200-205-300-345/350-5-305-25-30.
105-A-110-240-B-220-207-310-20.
Treatment flow direction.
6/11.
FIG. 6.
[It bears a picture].
Treatment channel.
1-2-100-206-205-200-300-364-345/350-305-400-40.
105-110-240-220-207-362-360-361-5-310-20-25-405-410-415.
Treatment flow direction.
7/11.
FIG. 7.
[It bears a picture].
Treatment channel.
1-225-205-364-C-345/350-5-D-305-25-30.
225-207-310-360-C-362-361-D-20.
Treatment flow direction.
8/11.
FIG. 8.
SECTION A.A.
[It bears a picture].
1-10-125-120-10-115-110.
9/11.
FIG. 9.
SECTION B.B.
[It bears a picture].
1-10-245-205-240-225-10-200-220.
FIG. 10.
SECTION B.B.
[It bears a picture].
1-10-362-320-315-360-320-315-361-10-345/350-310.
10/11.
FIG. 11.
SECTION D.D.
[It bears a picture].
1-10-362-330-335-360-361-330-335-10-305-325-340.
FIG. 12.
[It bears a picture].
10-5-12-15-20-25-30.
11/11.
FIG. 13.
20-10-5-11-12-10-15-1.
Application 870200089809, on Jul. 20, 2020.

The invention claimed is:

1. Sewage treatment process, coupled with a modified flexible flotation/decanting system, for the treatment of sewage, in that it is carried out at a treatment station, in a continuous, linear, and flexible channel, using the following stages:

PHASE 1—preliminary treatment of the sewage, with the installation of a garbage-trap grid, followed by a sandbox in the channel, wherein the garbage-trap grid traps floating and submerged solid waste, and the sandbox traps sand and silt contained in sewage flow, and the sewage flows through the continuous, linear, and flexible channel, to a PHASE 2 of the treatment, which constitutes the primary treatment;

PHASE 2—Primary treatment of the sewage, wherein the sewage from Phase 1 is provided primary treatment inside a modified MBBR aerobic reactor; the reactor modification comprising installing impermeable walls inside an MBBR aerobic reactor, to form channels inside the MBBR aerobic reactor itself, in order to channel the sewage flow from an inlet to an outlet of the modified MBBR aerobic reactor; at the passageways formed by said channels, respective cage-shaped traps are installed, which accommodate and trap biomedia, and the biomedia move within the cage-shaped traps, driven by aerators installed at a bottom of the modified MBBR aerobic reactor; said primary treatment comprises oxygen-enriched aeration that stirs the biomedia inside the modified MBBR aerobic reactor, and, after primary treatment, the sewage from this PHASE 2 is directed to PHASE 3, wherein it is provided secondary treatment; and PHASE 3—Secondary treatment of the sewage from PHASE 2, wherein the sewage, after leaving PHASE 2, is routed to the secondary treatment by the modified, flexible decanting/flotation system, whereby the sewage need not pass through an equalization tank, and a routing modification is carried out within the continuous, linear, and flexible channel by installation of a longitudinal septum arranged in a centralized or decentralized manner in relation to the continuous, linear, and flexible channel, equipped with individual inlet gates; the longitudinal septum being arranged along an inside area of said continuous, linear, and flexible channel, to split the continuous, linear, and flexible channel into at least two parallel linear sub-channels, allowing individual operation of each sub-channel, independently from each other; the secondary treatment by the flexible, modified decanting/flotation system being carried out with a coagulation stage and a flocculation stage, using a mixture of coagulant and flocculant, followed by flotation or decanting, removal of floated sludge or decanted sludge, and passage of treated sewage; the treated sewage flowing to a receiving water body.

2. Sewage treatment process, coupled with a modified flexible flotation/decanting system, for the treatment of sewage, according to claim 1, wherein said sand box of said primary treatment comprises moving sand traps each equipped with an upper cable for lifting, having an upper end is provided with a float for flotation above a sewage flow level.

3. Sewage treatment process, coupled with a modified flexible flotation/decanting system, for the treatment of sewage, according to claim 1, in that the sewage, after receiving preliminary treatment, enters through the channels arranged inside the modified MBBR aerobic reactor, and said sewage is driven by oxygen-enriched aerators installed at the bottom of said modified MBBR aerobic reactor, passes through the cage-shaped traps, which trap the biomedia, and reaches the outlet of the modified MBBR aerobic reactor.

4. Sewage treatment process, coupled with a modified flexible flotation/decanting system, for the treatment of sewage, according to claim 1, wherein the secondary treatment comprises a stage of coagulation and a stage of flocculation followed by a stage of flotation or decanting, with resulting floated sludge driven by channel flow, aided by an existing retractable scraper device on an overhead crane-type lifting device, and being removed from the channel through a dredging wheel installed downstream from the flotation or decanting stage, or resulting decanted sludge being removed from the channel through a suction device installed at a bottom of said channel.

5. Sewage treatment process, coupled with a modified flexible flotation/decanting system, for the treatment of sewage, according to claim 1, in that an overhead crane-type lifting device is installed above the continuous, linear, and flexible channel, equipped with a retractable sludge scraper at a bottom of the lifting device, which extends to below the sewage flow level, and said overhead crane-type lifting device moves along an entire length of the continuous, linear, and flexible channel, from upstream of the preliminary treatment stage, to downstream of a sewage outlet and to the receiving water body, through rails installed on sides of said continuous, linear, and flexible channel, and further comprising a displacement rail arranged transversely to the continuous, linear, and flexible channel, where the lifting device itself is fastened to the displacement rail, whereby positioning for lifting is allowed at any point within the continuous, linear, and flexible channel.

6. Sewage treatment process, coupled with a modified flexible flotation/decanting system, for the treatment of sewage, according to claim 1, in that it is carried out at a treatment station, in the continuous, linear, and flexible channel, using a following optional stage:
PHASE 4—Disinfection of the sewage from PHASE 3, wherein the sewage already treated at PHASES 1, 2, and 3 passes through channels formed by the arrangement of impermeable walls inside the sewage channel, wherein sewage flow already treated at the previous phases 1, 2, and 3 is subjected to disinfection by adding sodium hypochlorite or other oxidizing agent to the sewage flow as it flows through said formed channels, and the treated, disinfected sewage flows to the receiving water body.

7. Sewage treatment process, coupled with a modified flexible flotation/decanting system, for the treatment of sewage, in that it is carried out at a treatment station, in a continuous, linear, and flexible channel, using the following stages:
PHASE 1—preliminary treatment of the sewage, with the installation of a garbage-trap grid, followed by a sandbox in the channel, wherein the garbage-trap grid traps floating and submerged solid waste, and the sandbox traps the-sand and silt contained in sewage flow, and the sewage flows through the continuous, linear, and flexible channel, to a PHASE 2 of the treatment, which constitutes the primary treatment;
PHASE 2—Primary treatment of sewage, wherein the sewage from Phase 1 receives primary treatment inside a pond converted into a modified aerobic reactor; wherein the conversion is done by installing aerators at a bottom of said pond, and installing impermeable walls within said pond to form of channels within said pond, to direct the sewage flow from an inlet of the pond converted into a modified MBBR aerobic reactor to its outlet; at passageways formed by said channels, respective cage-shaped traps are arranged, which accommodate and trap biomedia, and the biomedia is stirred within the cage-shaped traps, driven by aerators arranged at the bottom of said pond converted into modified MBBR aerobic reactors; said primary treatment comprises oxygen-enriched aeration, which stirs the biomedia inside the modified MBBR aerobic reactor, and, after primary treatment, the sewage from this PHASE 2, is directed to PHASE 3, wherein it is provided secondary treatment; and
PHASE 3—Secondary treatment of the sewage from PHASE 2, wherein the sewage, after leaving PHASE 2, is routed to secondary treatment by the modified, flexible decanting/flotation system, whereby the sewage need not pass through an equalization tank, and a routing modification is carried out within the continuous, linear, and flexible channel by installation of a longitudinal septum arranged in a centralized or decentralized manner in relation to the continuous, linear, and flexible channel, equipped with individual inlet gates; the longitudinal septum being arranged along an inside area of said continuous, linear, and flexible channel, to split the continuous, linear, and flexible channel into at least two parallel linear sub-channels, allowing individual operation of each sub-channel, independently from each other; the secondary treatment by the flexible, modified decanting/flotation system being carried out with a coagulation stage and a flocculation stage, using a mixture of coagulant and flocculant, followed by flotation or decanting, removal of floated sludge or decanted sludge, and passage of treated sewage; the treated sewage flowing to a receiving water body.

8. Sewage treatment process, coupled with a modified flexible flotation/decanting system, for the treatment of sewage, according to claim 7, in that the sewage, after receiving preliminary treatment, enters through the channels arranged inside the pond converted into a modified MBBR aerobic reactor, and said sewage is driven by oxygen-enriched aerators arranged at the bottom of said modified MBBR aerobic reactor, passing passes through the cage-shaped traps, which trap the biomedia, and reaches the outlet of the modified MBBR aerobic reactor.

9. Sewage treatment process, coupled with a modified flexible flotation/decanting system, for the treatment of sewage, in that it is carried out at a treatment station, in a continuous, linear, and flexible channel, using the following stages:

PHASE 1—preliminary treatment of the sewage, with the installation of a garbage-trap grid, followed by a sandbox in the channel, where the garbage-trap grid traps floating and submerged solid waste, and the sandbox traps sand and silt contained in sewage flow, and the sewage flows through the continuous, linear, and flexible channel, to a PHASE 2 of the treatment, which constitutes the primary treatment;

PHASE—Primary treatment of sewage, wherein the sewage from Phase 1 receives primary treatment inside an UASB anaerobic reactor converted into a modified MBBR aerobic reactor; the conversion is made by removing the entire contents from inside an UASB anaerobic reactor, by installing aerators at a bottom of a common UASB anaerobic reactor, by installing impermeable walls inside said regular UASB anaerobic reactor, to form channels, in order to drive the sewage flow from an inlet of the UASB anaerobic reactor converted into a modified MBBR aerobic reactor to an outlet, and at passageways formed by said inside channels, respective cage-shaped traps are arranged, which accommodate and trap biomedia, and the biomedia move inside the cages-shaped traps, driven by the aerators installed at the bottom of said UASB anaerobic reactor converted into a modified MBBR aerobic reactor; said primary treatment comprises oxygen-enriched aeration, which stirs the biomedia inside the modified MBBR aerobic reactor, and, after primary treatment, the sewage from this PHASE 2 is driven to PHASE 3, wherein it is provided secondary treatment; and PHASE 3—Secondary treatment of the sewage from PHASE 2, wherein the sewage, after leaving PHASE 2, is routed to secondary treatment by the modified, flexible decanting/flotation system, whereby the sewage need not pass through an equalization tank, and such modification is carried out within the continuous, linear, and flexible channel by the installation of a longitudinal septum arranged in a centralized or decentralized manner in relation to the continuous, linear, and flexible channel, equipped with individual inlet gates; the longitudinal septum being arranged along an inside area of said continuous, linear, and flexible channel, to split the main continuous, linear, and flexible channel into at least two parallel linear sub-channels, allowing individual operation of each sub-channel, independently from each other; the secondary treatment by the flexible, modified decanting/flotation system being carried out with a coagulation stage and a flocculation stage, using a mixture of coagulant and flocculant, followed by flotation or decanting, removal of floated sludge or decanted sludge, and the passage of treated sewage; the treated sewage flowing to a receiving water body.

10. Sewage treatment process, coupled with a modified flexible flotation/decanting system, for the treatment of sewage, according to claim 9, in that the sewage, after receiving preliminary treatment, enters through the channels arranged inside an anaerobic UASB reactor converted into a modified MBBR aerobic reactor, and said sewage is driven by oxygen-enriched aerators arranged at the bottom of said modified MBBR aerobic reactor, passing passes through the cage-shaped traps, which trap the biomedia, and reaches the outlet of the modified MBBR aerobic reactor.

* * * * *